US008270276B2

(12) United States Patent
Minamiguchi et al.

(10) Patent No.: US 8,270,276 B2
(45) Date of Patent: Sep. 18, 2012

(54) OPTICAL DISC DRIVE AND METHOD OF CONTROLLING POWER OF LASER LIGHT IN RECORDING TO OPTICAL DISC

(75) Inventors: Shuichi Minamiguchi, Tokyo (JP); Hajime Nishimura, Tokyo (JP); Hiroharu Sakai, Tokyo (JP); Kazuhiko Ono, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/178,557

(22) Filed: Jul. 8, 2011

(65) Prior Publication Data

US 2012/0008478 A1    Jan. 12, 2012

(30) Foreign Application Priority Data

Jul. 8, 2010   (JP) ................................. 2010-155868

(51) Int. Cl.
   *G11B 11/00*     (2006.01)
(52) U.S. Cl. ................... 369/53.27; 369/47.51
(58) Field of Classification Search .................. None
   See application file for complete search history.

(56) References Cited

U.S. PATENT DOCUMENTS 5,809,001 A * 9/1998 Gage et al. ................. 369/53.26
6,888,861 B2 * 5/2005 Taguchi et al. ............. 372/38.1

FOREIGN PATENT DOCUMENTS

JP      2004-146050      5/2004

* cited by examiner

*Primary Examiner* — Paul Huber
(74) *Attorney, Agent, or Firm* — Antonelli, Terry, Stout & Kraus, LLP.

(57) ABSTRACT

This invention provides accurate control of laser light power in a recording operation to achieve more stable recording operation. An optical disc drive in an embodiment of this invention monitors the power of laser light with a monitor diode and controls the laser light power based on the result of monitoring. The optical disc drive changes data transfer rate (recording frequency) depending on the disc radial position. The optical disc drive controls the gain of the monitor diode across the recording surface depending on the recording frequency. This control improves the accuracy in laser light power control to achieve stable recording operations by precise servo control.

10 Claims, 9 Drawing Sheets

|  |  | THRESHOLD 1 | THRESHOLD 2 | THRESHOLD 3 | THRESHOLD 4 |
|---|---|---|---|---|---|
| MONITOR DIODE GAIN | G_0 | G_1 | G_2 | G_3 | G_4 |

*FIG. 8*

OPTICAL DISC DRIVE AND METHOD OF CONTROLLING POWER OF LASER LIGHT IN RECORDING TO OPTICAL DISC

CLAIM OF PRIORITY

The present application claims priority from Japanese patent application JP 2010-155868 filed on Jul. 8, 2010, the content of which is hereby incorporated by reference into this application.

BACKGROUND OF THE INVENTION

This invention relates to an optical disc drive and a method of controlling the power of laser light in a recording to an optical disc. In particular, this invention relates to gain control of a detector that detects the laser light to control the power of a laser light source.

Optical disc drives have a variety of applications, for example, in motion picture players, motion picture recording players, and data storage devices for computers. CD (Compact Disc), DVD (Digital Versatile Disc), and BD (Blu-ray Disc) are known as the kinds of optical disc for storing data. The CD, DVD, and BD each have a disc type for read only and a disc type for read and write.

An optical disc drive irradiates an optical disc with laser light emitted from a laser light source and reads data recorded on the optical disc with the laser light reflected off the recording surface of the optical disc. An optical disc drive having a recording function irradiates the recording surface of an optical disc with laser light to change the state of the recording surface, which results in recording data onto the optical disc.

For accurate and stable recording and reading, the power of laser light (laser output power) should be controlled with accuracy. For this reason, an optical disc drive includes a system that automatically controls the laser light power. This is called APC (Automatic Power Control). The APC monitors the power (intensity) of the laser light from the laser light source and adjusts drive current supplied to the laser light source so that the laser light power falls within a desired range.

The power of laser light is required to be controlled accurately and stably for proper servo control as well. An optical disc drive positions a laser spot precisely at a target position (positioning control of laser spot) through servo control of a pickup (optical head). The servo control system in the optical disc drive performs tracking servo control, which is positioning control in the disc radial direction, and focusing servo control. Since the servo control system uses (the RF signal of) the reflection of laser light off the recording surface like in reading user data, accurate and stable control of the laser luminance power is required for accurate and stable servo control.

The APC receives a part of the light thrown by the laser light source to an optical disc at a photodiode element and converts the light signal into an electric signal. This electric signal is amplified by an amplifier and transferred to a controller. The circuit module (laser-light detector) including the photodiode element and the amplifier is called monitor diode in this description.

The power of laser light applied to an optical disc is different depending on the kind of optical disc and whether the laser light is for a recording operation or a reading operation. Accordingly, the power of the laser light received by the photodiode element also varies depending on them. In the case where the gain of (the amplifier of) the monitor diode is fixed, the output from the monitor diode varies significantly with the intensity of the laser light. For this reason, APC has been proposed that alters the gain of the monitor diode depending on the laser light power (for example, refer to JP 2004-146050 A).

SUMMARY OF THE INVENTION

Varying the gain of the monitor diode depending on the emission intensity of a laser light source enables the level of the monitor diode output to be higher than a predetermined level. This configuration achieves accurate APC. The inventors, however, have found the importance of considering factors other than the laser light power in controlling the gain of the monitor diode for recording operations to an optical disc.

Some kinds of recordable optical discs have been known; to such optical discs, different rotational control schemes for recording operations are applied. Specifically, rotational schemes of CLV (Constant Linear Velocity), CAV (Constant Angular Velocity), ZCLV (Zoned Constant Linear Velocity), and ZCAV (Zoned Constant Angular Velocity) have been known.

The CLV scheme controls rotations of an optical disc so that the linear velocity will be constant in recording data at any radial position. The CAV scheme keeps the angular velocity constant in recording data regardless of the radial position. Accordingly, as the recording position moves toward the outermost diameter, the linear velocity increases. The ZCLV scheme separates the recording surface of an optical disc into a plurality of concentric annular zones, records data by the CLV scheme within a zone, and changes the angular velocity at changing zones. The ZCAV scheme separates the recording surface of an optical disc into a plurality of concentric annular zones and records data by the CAV scheme within a zone.

On the recording surface of an optical disc, data recording density (bit/inch) is uniform regardless of the disc radial position. This configuration allows an optical disc drive to read data from an optical disc recorded by a different optical disc drive with accuracy regardless of the rotational control scheme in its recording operation (conservation of compatibility).

In the three rotational control schemes except for the CLV scheme out of the foregoing four rotational control schemes, the linear velocity changes with disc radial position. As described above, the data recording density of an optical disc is the same at any disc radial position. Accordingly, the optical disc drive changes the recording frequency (data transfer rate) depending on the linear velocity in its data recording operation.

The inventors have found that a constant monitor diode gain may adversely affect the APC in recording data under the condition where the recording frequency changes with the radial position on the same recording surface. Specifically, the monitor diode might not be able to sample the power of laser light impinging on spaces (areas between recording marks on the recording surface of an optical disc). This inhibits accurate APC.

Appropriate servo control cannot be carried out under inaccurate APC; as a result, recording operations become unstable. Accordingly, demanded is a monitor diode gain control that achieves appropriate APC and servo control in recording data where the recording frequency changes with the disc radial position.

An aspect of the invention is an optical disc drive including a motor for rotating an optical disc, a laser light source for emitting laser light to the optical disc being rotated, a monitor photodetector for receiving the laser light from the laser light source to control the laser light, a laser power controller for controlling output power of the laser light source depending on output of the monitor photodetector, a controller for controlling gain of the monitor photodetector in a recording to a recording surface of the optical disc depending on recording frequency changing with disc radial position.

An aspect of this invention accomplishes more appropriate laser light power control and servo control in recording data where recording frequency changes with the radial position on an optical disc.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 8 exemplifies a gain setting table used in the monitor diode gain control illustrated in FIG. 7C in the embodiment;

DETAILED DESCRIPTION OF THE EMBODIMENTS

Hereinafter, an embodiment of this invention will be described. For clarity of explanation, the following descriptions and the accompanying drawings contain omissions and simplifications as appropriate. Throughout the drawings, like components are denoted by like reference signs and their repetitive explanation is omitted for clarity of explanation, if not necessary.

This embodiment has a feature in output power control of a laser in an optical disc drive. In this embodiment, this control is referred to as APC (Automatic Power Control). The APC compensates for a change in luminous efficiency caused by a change in ambient temperature around the laser light source or degradation over time to control the laser light power (laser light intensity) so as to be stable.

An optical disc drive includes a monitor diode that receives laser light from a laser light source to monitor the luminance power (laser light power). The monitor diode is a photodetector that generates an electric signal corresponding to the laser light power from the laser light source (converts a light signal into an electric signal). The monitor diode sends the electric signal representing the detected laser light power to a laser light controller.

The laser light controller controls drive current to the laser light source based on the results of measurement at the monitor diode to obtain a desired laser light power. The optical disc drive of this embodiment has a feature particularly in its gain control (sensitivity control) of the monitor diode in recording operations. The gain control in this embodiment is applicable to optical disc drives that change recording frequency (data transfer rate) depending on the disc radial position. The optical disc drive of this embodiment controls monitor diode gain depending on the recording frequency onto a recording surface for more accuracy in APC, which results in appropriate servo control to achieve stable recording operations.

Figure 1:
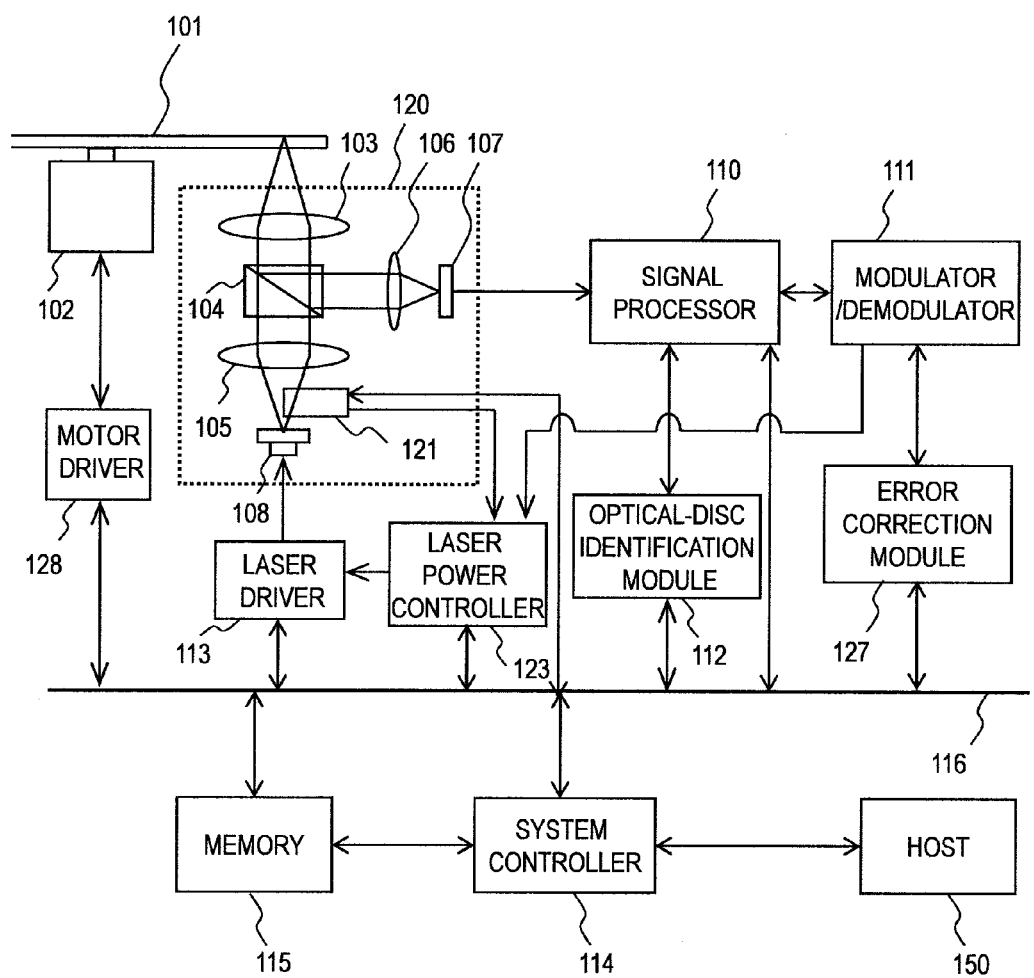
FIG. 1 is a block diagram schematically illustrating an overall configuration of an optical disc drive in an embodiment of this invention.

Before explaining the APC in this embodiment in detail, an overall configuration of an optical disc drive in this embodiment will be described with reference to the block diagram of FIG. 1. FIG. 1 is a block diagram schematically illustrating a configuration of an optical disc drive 100 in this embodiment. This optical disc drive 100 is connected to a host computer 150 and transfers data read from an optical disc 101 (for example, a Blu-ray Disc or BD) loaded therein to the host computer 150.

The optical disc drive 100 further receives data transferred from the host computer 150 and records the data onto a writable optical disc 101 (for example, a BD-R). This embodiment has a feature in the APC in recording operations.

The optical disc drive 100 includes a spindle motor 102, a signal processor 110, a modulator/demodulator 111, an optical-disc identification module 112, a laser driver 113, a system controller 114, a memory 115, a data bus 116, an optical pickup 120, a laser power controller 123, an error correction module 127, and a motor driver 128.

The spindle motor 102 rotates an optical disc 101 loaded thereon. The motor driver 128 drives the spindle motor 102. The system controller 114 controls the rotating speed (angular velocity) of the spindle motor 102 through the motor driver 128.

Specifically, the system controller 114 sets data specifying a rotating speed to a register in the motor driver 128 and the motor driver 128 applies drive current to the spindle motor 102 so as to attain the rotating speed specified by the data. The system controller 114 keeps the rotating speed constant in accordance with a rotational control method for recording operation, or changes the rotating speed for the disc radial position of a recording target. This will be described later.

The optical pickup 120 includes an object lens 103, a beam splitter 104, a collimating lens 105, a focal lens 106, a photoelectric converter 107, a laser light source 108, and a monitor diode 121. When reading data from the optical disc 101, the optical pickup 120 irradiates the optical disc 101 with weak laser light, reads data recorded on the optical disc 101 using the reflection of the laser light, and outputs a signal corresponding to the reflection.

The laser light source 108 is typically a semiconductor laser that generates a predetermined intensity (power) of laser light for recording or reading. The laser light source 108 emits laser light having a wavelength specified for each kind of disc to be loaded. The laser light emitted by the laser light source 108 passes through the collimating lens 105 and the object lens 103, and impinges on a specified radial position of the recording surface of the optical disc 101. The object lens 103 is driven by an actuator in the optical pickup 120 and is adjusted so that laser light is focused on the optical disc surface.

In recording data onto the optical disc 101, the laser light source 108 irradiates the optical disc 101 with more intensive laser light than in reading data therefrom. On the recordable optical disc 101, the heat at the spot irradiated with the laser light changes the physical properties of the recording layer to form a recording pit (mark). The reflectance of the recording layer is changed at the recording pit to record data. In a recording operation, the laser light source 108 irradiates a non-recording area, which is called space, with laser light weaker than in recording (forming a mark). The optical disc drive 100 carries out servo control using the laser light reflected off such spaces.

In reading data, the laser light reflected from the recording surface of the optical disc 101 is split by the beam splitter 104, collected by the focal lens 106, and directed to the photoelectric converter 107. The photoelectric converter 107 converts the received reflection into an electric signal and outputs the electric signal corresponding to the reflection. The signal processor 110 generates an RF signal from the electric current signal outputted by the photoelectric converter 107.

The monitor diode 121 is a photodetector for monitoring laser light power and measures the power of the laser light (the intensity of the laser light) for APC. The monitor diode 121 includes a photodiode of a photoelectric conversion element and an amplifier that converts the output of the photodiode into voltage and amplifies it. In this embodiment, the gain (sensitivity) of the monitor diode 121 is variable and the system controller 114 controls its gain.

This embodiment has a feature in the gain control of the monitor diode 121 in recording operations. The details of this feature will be described later. The monitor diode output signal detected at the monitor diode 121 is supplied to the laser power controller 123.

The signal processor 110 is a digital signal processor (DSP), which generates digital data of an RF signal from the signal received from the photoelectric converter 107. The signal processor 110 also generates an optical-disc identifier signal differing depending on the structure of the optical disc, a focus error signal for adjusting the focal point of a light beam, and a tracking error signal for following a track of the optical disc 101 from the output of the photoelectric converter 107 and outputs them.

In reading operations, the modulator/demodulator 111 demodulates the digital data received from the signal processor 110 in accordance with the method determined for each kind of optical disc. In recording operations, the demodulator 111 modulates the data including user data and an error correction code in accordance with the method determined for each kind of optical disc. The error correction module 127 performs error detection and error correction on the demodulated data in reading operations. In recording operations, it generates an error correction code from user data and appends it to the user data. The memory 115 (buffer) temporarily stores data before error correction and data after error correction.

The optical-disc identification module 112 identifies the kind of the loaded optical disc 101 with reference to the optical-disc identifier signal outputted from the signal processor 110. The result of identification of the optical disc 101 outputted from the optical-disc identification module 112 is sent to the system controller 114 via the data bus 116.

The system controller 114 controls the modules to make optimum conditions (recording conditions/reading conditions) for the identified optical disc based on the result of identification of the optical disc. The system controller 114 performs tracking servo control and focusing servo control using the error signals from the signal processor 110.

The laser driver 113 outputs a laser drive signal 117 for driving the laser light source 108 in the optical pickup 120. The laser driver 113 applies a laser drive signal (drive current) to the laser light source 108 under control of the laser power controller 123.

The laser power controller 123 performs APC. The laser power controller 123 controls drive current to the laser light source 108 through the laser driver 113 to control the output power of the laser light source 108. The laser power controller 123 includes a register, which holds target values of laser power for recording and reading. The laser power controller 123 controls the drive current to the laser light source 108 with reference to the target values and results of measurement at the monitor diode 121. In recording operations, the laser power controller 123 controls the laser power based on the recording data transferred by the modulator/demodulator 111.

The system controller 114 includes a processor for controlling operations of the optical disc drive 100 and a memory. The system controller 114 may include a logic circuit to perform a specific process. The memory in the system controller 114 stores a program to be executed and data necessary for executing the program.

The system controller 114 further includes an interface for controlling sending and receiving data and commands between the optical disc drive 100 and the host computer 150 connected thereto. The system controller 114 controls reading of data temporarily stored in the memory 115 and writing of data to the memory 115. The system controller 114 interprets a command received from the host computer 150 and processes the received command.

The memory 115 includes a buffer area and temporarily stores data read from the optical disc 101 in the buffer area. The memory 115 further temporarily stores data transferred by the host computer 150. The data bus 116 interconnects the modules in the optical disc drive 100. Signals between modules are transmitted by the data bus 116. The configuration shown in FIG. 1 is an example of the module configuration of an optical disc drive; whether to implement each function by hardware or software depends on the design of the optical disc drive.

Figure 2:
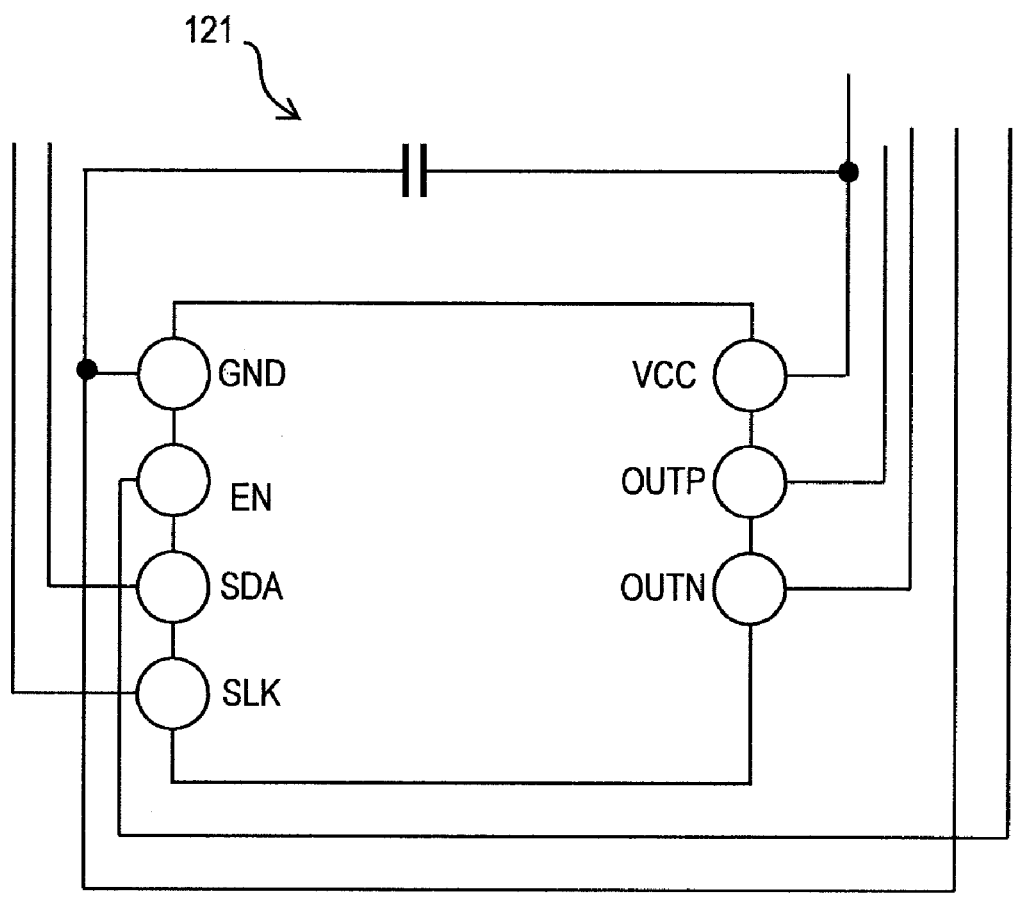
FIG. 2 is a diagram schematically illustrating a configuration of a monitor diode in the embodiment.

As described above, the optical disc drive 100 of this embodiment has a feature in its APC, and particularly in the gain control of the monitor diode 121. FIG. 2 is a peripheral schematic circuit diagram illustrating an example of the configuration of the monitor diode 121. In the example of FIG. 2, the monitor diode 121 has eight input and output terminals.

Specifically, the monitor diode 121 has a ground terminal GND, a power terminal VCC, monitor signal output terminals OUTP and OUTN, a serial data input terminal SDA, a clock terminal SLK, and an enable signal terminal EN.

The operating parameters of the monitor diode 121 are inputted from the serial data input terminal SDA in accordance with a clock signal from the clock terminal SLK. Particularly in this embodiment, the gain, or the sensitivity of the output, of (the amplifier in) the monitor diode 121 is settable. The system controller 114 sets a gain value to the monitor diode 121 through the serial data input terminal SDA. The system controller 114 controls whether to permit receiving at the serial data input terminal SDA with a signal to the enable signal terminal EN.

The monitor diode 121 outputs an electric signal (voltage signal) corresponding to the detected laser light power (intensity) from the output terminals OUTP and OUTN. Specifically, the monitor diode 121 converts received laser light into a voltage signal and amplifies it in accordance with the preset gain value. The amplified monitor signal is sent from the output terminals OUTP and OUTN to the laser power controller 123.

In this embodiment, the gain in the monitor diode 121 may be any parameter for the circuit modules in the monitor diode 121 as long as it defines the ratio of the output of electric signal to the input of laser light.

The laser power controller 123 internally holds a laser power target value. The laser power controller 123 compares the laser power target value with the output from the monitor diode 121 to calculate the difference value. The calculated difference value is supplied to the laser driver 113. In a recording operation, it uses laser power target values differing between in forming a mark and in irradiating a space and calculates the respective difference values.

The laser driver 113 controls the intensity of laser light from the laser light source 108 with the difference value calculated by the laser power controller 123. The difference value represents the drive current to the laser power source 108; the laser driver 113 supplies this drive current to the laser power source 108 to obtain a desired laser light power. This operation compensates for a change in I/L ratio caused by change in ambient temperature around the laser light source 108, degradation over time, and the like to provide stable laser intensity under control.

The system controller 114 sets laser power target values to the laser power controller 123. The system controller 114 sets the laser power target values for recording operations and for reading operations depending on the result of identification of the kind of optical disc by the optical-disc identification module 112.

Moreover, the system controller 114 in this embodiment refers to the gain value of the monitor diode 121 in determining the laser power target values. The intensity of the output signal from the monitor diode 121 responsive to the same intensity of laser light varies with the gain of the monitor diode 121. For this reason, the system controller 114 determines the target values depending on the gain of the monitor diode 121 in accordance with predetermined settings. In general, the greater the gain value, the greater the target values.

In place of the system controller 114, the laser power controller 123 may calculate the target values. For example, the laser power controller 123 obtains the value of the monitor diode gain from the system controller 114 and holds it. The laser power controller 123 determines the target values based on a result of identification by the optical-disc identification module 112 and the gain value, and holds the values.

The system controller 114 may determine the target values based on a result of identification by the optical-disc identification module 112 and alter the value obtained from the monitor diode 121 depending on the preset gain value. Alternatively, in calculating the difference between a target value and the output of the monitor diode, it may alter the both values depending on the gain value.

Hereinafter, determination of the gain of the monitor diode 121 in recording operations will be described in detail. In the configuration described below, the system controller 114 performs the process. Any constituent may perform this process depending on the design of the optical disc drive. In recording data, the system controller 114 determines the gain value of the monitor diode 121 depending on the disc radial position.

As described above, the recording frequency changes with the disc radial position in some rotational control schemes. The higher the recording frequency, the shorter the space period. The space period is a time of laser light irradiation of a space, which is an area between two marks.

Figure 3A:
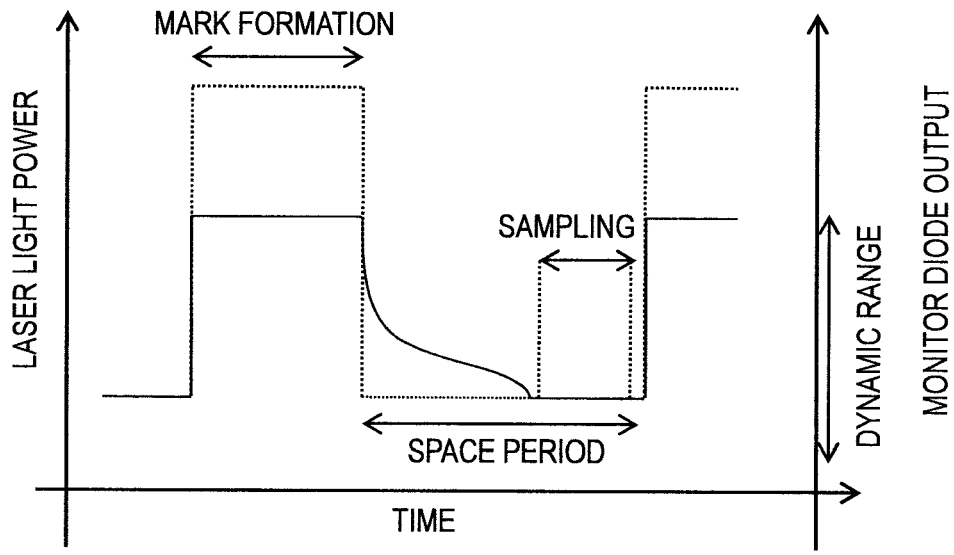
FIG. 3A is a drawing schematically illustrating the relationship among time, laser light power, and monitor diode output in a recording operation at low recording frequency in the embodiment.
Figure 3B:
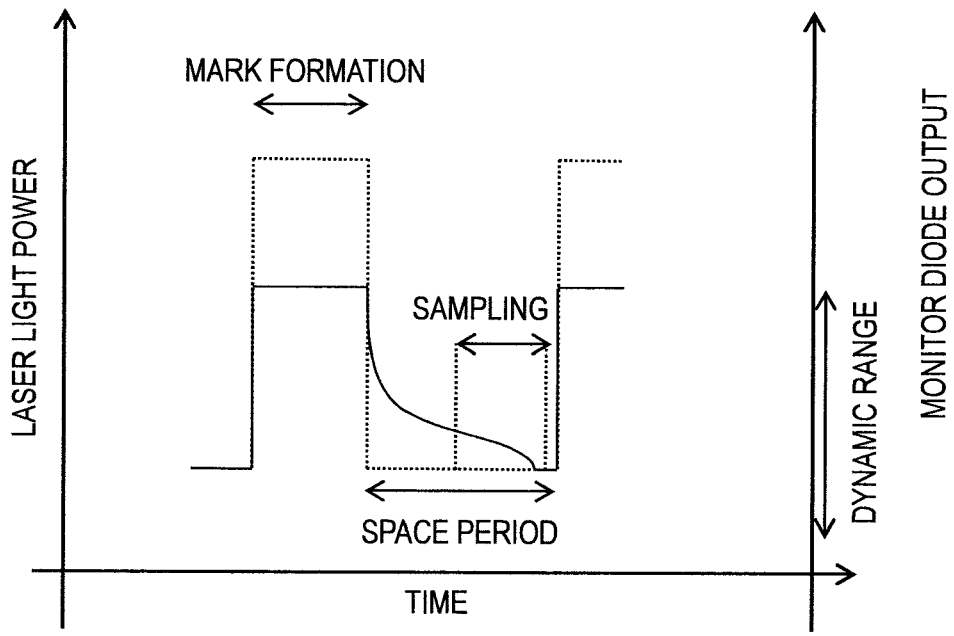
FIG. 3B is a diagram schematically illustrating the relationship among time, laser light power, and monitor diode output in a recording operation at high recording frequency in the embodiment.

FIG. 3A and FIG. 3B schematically illustrate relationships among the time, the laser light power, and the monitor diode output in a recording operation. In FIGS. 3A and 3B, the X-axes represent the time, the left Y-axes represent the laser light power, and the right Y-axes represent the monitor diode output. In the two drawings, the dotted lines represent the laser light power and the solid lines represent the monitor diode output. FIGS. 3A and 3B indicate the conditions where the monitor diode outputs are saturated.

FIG. 3A shows the laser light power and the monitor diode output at relatively low recording frequency. FIG. 3B shows those at relatively high recording frequency. The data (bit strings) in the recording operations in FIGS. 3A and 3B are the same; typically, they have the shortest space length (physical space length) in the recording format.

As shown in FIGS. 3A and 3B, if the monitor diode output is saturated in forming a mark, a certain time (in this description, referred to as reset time) is required for the monitor diode output to fall to a value corresponding to the laser light power even after the laser light power has fallen from a value for forming a mark to a value for irradiating a space. Since the reset time does not depend on the recording frequency, it is the same in FIGS. 3A and 3B.

At the low recording frequency in FIG. 3A, a space period enough for the reset time is secured. Accordingly, the optical disc drive 100 can perform appropriate sampling for APC during the space period. On the other hand, at the high recording frequency in FIG. 3B, the space period is shorter. Accordingly, the space period is too short for the reset time, so that the optical disc drive 100 cannot perform appropriate APC sampling. As a result, it cannot perform accurate APC and appropriate servo control using reflection off a space is not achieved.

Unless the monitor diode output is saturated, the reset time is zero. Accordingly, it is preferable that the gain control for the monitor diode 121 determine the gain value so that the monitor diode output will not be saturated.

Figure 4:
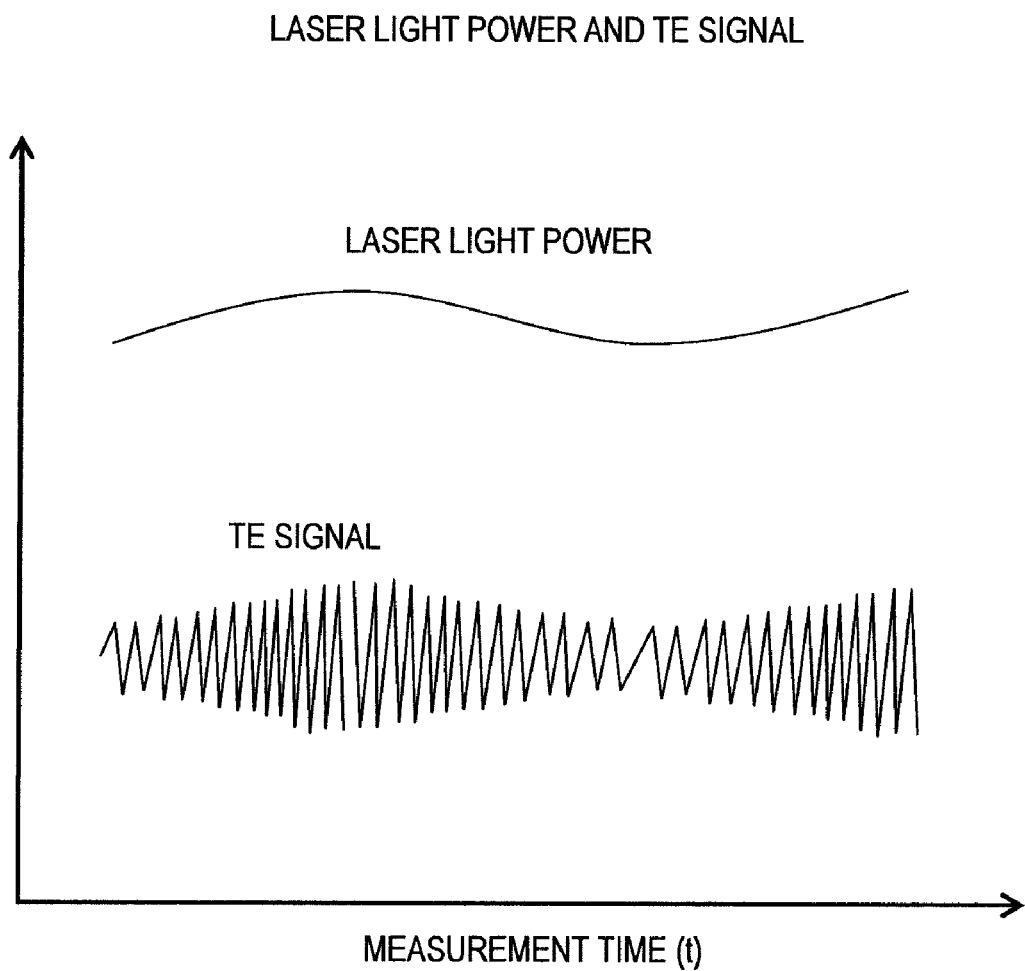
FIG. 4 is a drawing schematically illustrating the relationship between the laser light power varied by noise in the monitor diode output and a tracking error (TE) signal in the embodiment.

In the meanwhile, for the APC sampling in a space period, it is preferable that the monitor diode output be higher. FIG. 4 schematically illustrates the relationship between the laser light power and a tracking error (TE) signal, which is a servo signal. The TE signal is a detection signal of laser light reflected off the optical disc 101; it varies with laser light power from the laser light source 108. Since the APC changes the laser power depending on the output of the monitor diode 121, the laser light power varies with the monitor diode output varied by noise, resulting in variation in the TE signal. The smaller the signal amplitude of the TE signal, the lower the accuracy and stability in servo control.

The noise in the monitor diode output is generated in an output transmission line of the monitor diode 121. For this reason, to reduce the effect of the noise to the monitor diode output, it is effective to increase the monitor diode gain. Increasing the gain raises the value of the monitor diode output and lowers the noise level with respect to the output value.

As described, it is preferable that the monitor diode gain be larger in a space period for low noise. In contrast, as understood from the description with reference to FIGS. 3A and 3B, the possibility of adverse effect of the saturation of the monitor diode output to APC increases as the recording frequency rises. Accordingly, avoiding saturation is more important at higher recording frequencies. The reset time extends as the saturation level of the monitor diode output rises. Accordingly, it is important that the saturation level be lower at higher recording frequencies even if the monitor diode output is saturated in forming a mark.

The optical disc drive 100 in this embodiment controls the gain of the monitor diode 121 depending on the recording frequency across a recording surface. The recording density (bit/inch) in an optical disc 101 is uniform regardless of the disc radial position; the variation in the recording frequency across the recording surface corresponds to the variation in linear velocity of the optical disc 101.

Figure 5:
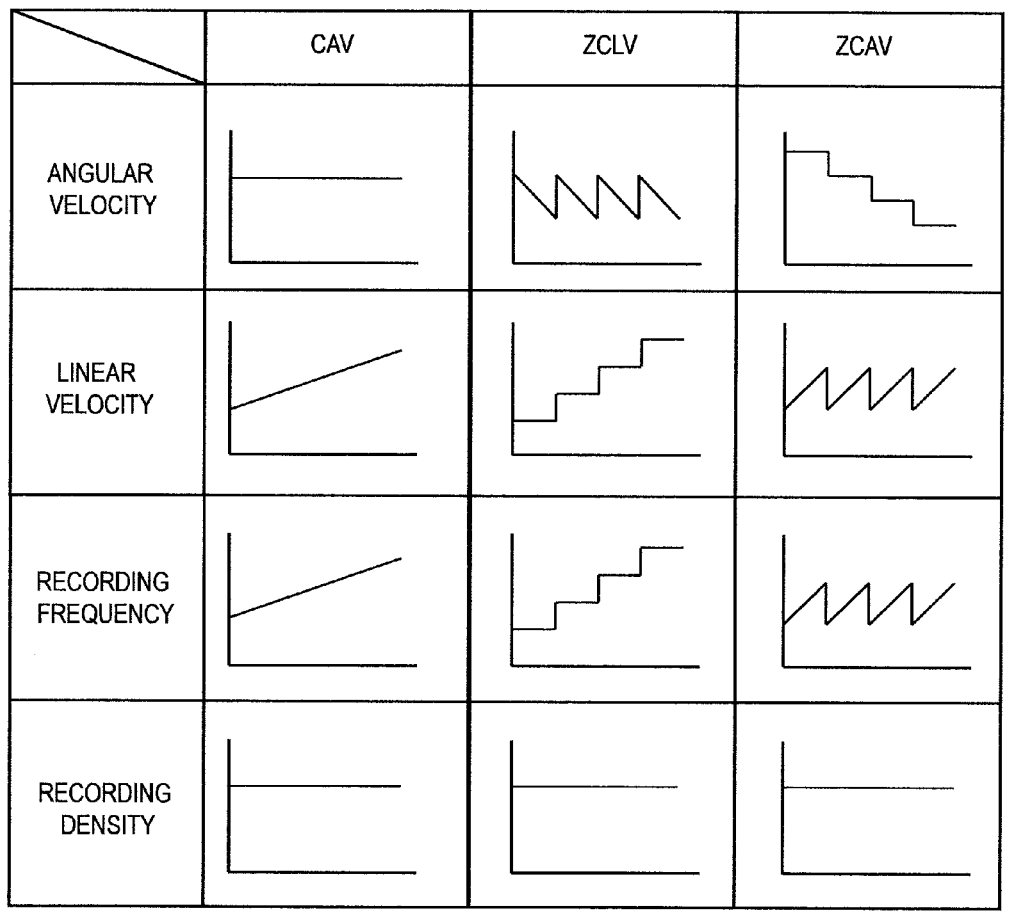
FIG. 5 is a drawing illustrating a plurality of different rotational control schemes in the embodiment.

In the rotational control schemes employed in data recording to disc media, the schemes where the linear velocity varies with radial position are the CAV (Constant Angular Velocity) scheme, the ZCLV (Zoned Constant Linear Velocity) scheme, and the ZCAV (Zoned Constant Angular Velocity) scheme. FIG. 5 schematically illustrates the angular velocities, the linear velocities, the recording frequencies, and the recording densities in these rotational control schemes. The X-axis in each graph in FIG. 5 represents the disc radial position (the distance from the center).

As illustrated in FIG. 5, the CAV scheme keeps the angular velocity (the number of rotations in a unit time) in disc rotation at a constant value. In the CAV scheme, as the recording position moves to an outer diameter (away from the center), the linear velocity and the recording frequency increase linearly. The angular velocity may be different depending on the optical disc drive.

The ZCLV scheme separates a recording surface into a plurality of concentric annular zones and keeps the linear velocity at a constant value in each zone. The linear velocity across the plurality of zones increases toward the outermost zone. In other words, the linear velocity changes discretely at the boundaries between zones and changes stepwise depending on the disc radial position (increases at every outer boundary). The recording frequency shows changes similar to those in the linear velocity. The locations of the zone boundaries, the number of zones, and the linear velocities in individual zones are determined by the design of the optical disc drive 100.

The ZCAV scheme keeps the angular velocity at a constant value in each zone. The angular velocity across the zones decreases toward the outermost zone and shows discrete stepwise changes at the boundaries between zones (decreases at every outer boundary). In each zone, the recording frequency linearly increases toward an outer diameter. The recording frequency at the innermost position in each zone is the same and the recording frequency at the outermost position in each zone is the same. The locations of the zone boundaries, the number of zones, and the angular velocities in individual zones are determined by the design of the optical disc drive 100.

The optical disc drive 100 employs an appropriate recording scheme depending on the design, the kind of the optical disc 101, and the use of the optical disc 101. The monitor diode gain control in this embodiment may be applied to recording operations using any rotational control schemes described above. It is particularly suitable for the CAV scheme and the ZCLV scheme where the variation in recording frequency with the disc radial direction is significant.

Figure 6:
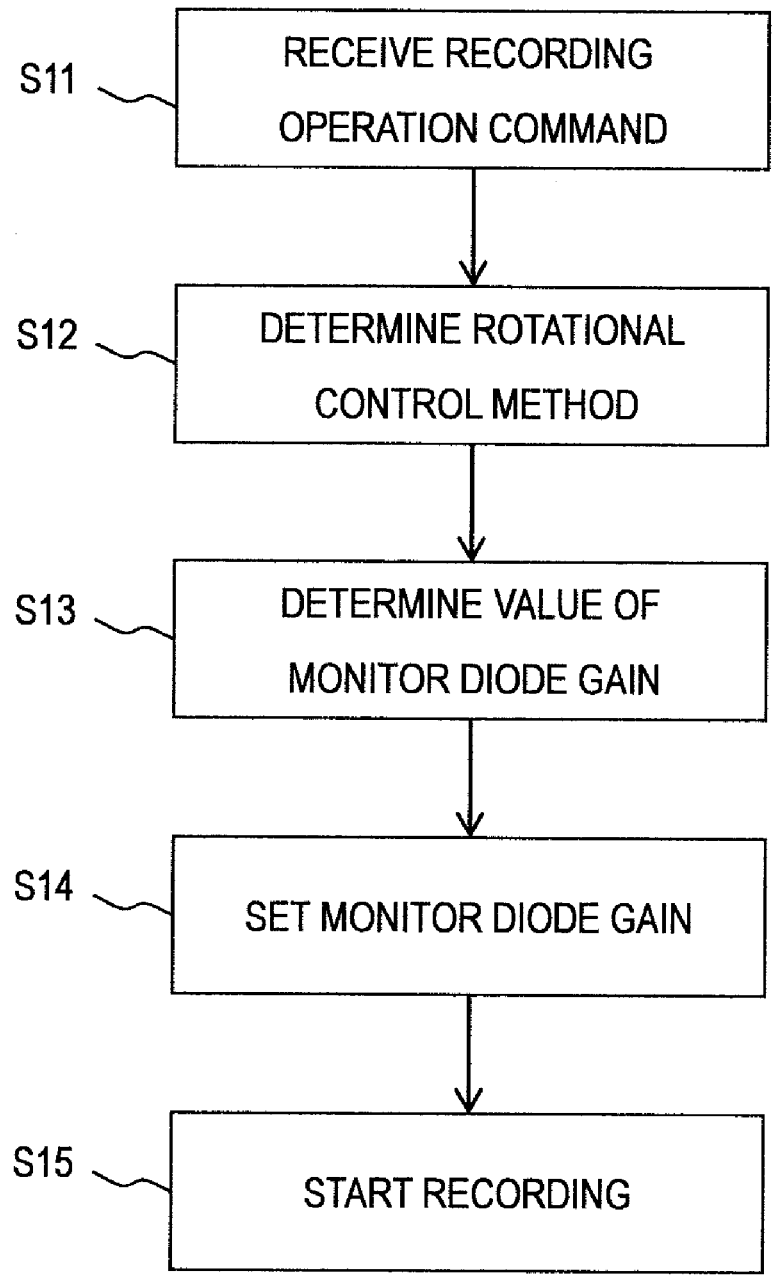
FIG. 6 is a flowchart illustrating gain control of the monitor diode in the embodiment.

Now, with reference to the flowchart of FIG. 6, the monitor diode gain control in a recording operation will be described. The system controller 114 receives a recording operation command from the host computer 150 (S11). The recording operation command designates the address where to record data. The designated address is data indicating the radial position on the recording surface of the optical disc 101 and the system controller 114 can find the radial position to record the data from the designated address.

The system controller 114 determines the rotational control method in the recording operation to the loaded optical disc from the kind of optical disc identified at loading the optical disc (S12). The relationship between the kind of optical disc and the rotational control method may be preset in the optical disc drive 100. For example, the optical disc drive 100 may have a preset table that associates the kinds of optical disc (and/or any other factor) with the rotational control methods.

The system controller 114 determines the gain value of the monitor diode 121 from the selected rotational control method and the disc radial position (address) (S13). Then, the system controller 114 sets the determined gain value to a register in the monitor diode 121 (S14) and writes user data received from the host computer 150 at the address designated by the host computer 150 (S15).

Figure 7A:
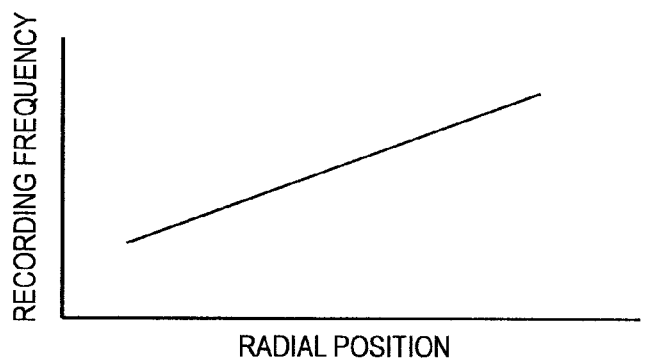
FIG. 7A is a graph depicting the relationship between the disc radial position and the recording frequency in a recording operation using the CAV scheme in the embodiment.
Figure 7B:
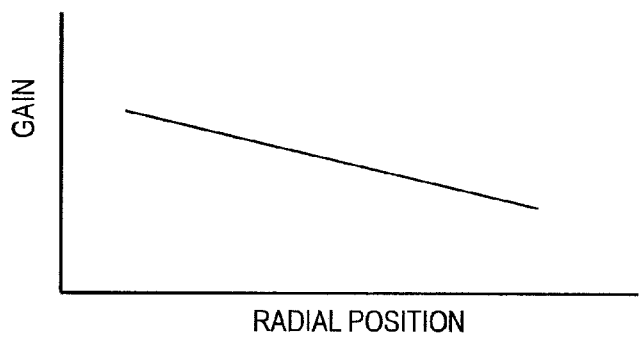
FIG. 7B is a drawing illustrating a method of controlling the monitor diode gain in a recording operation using a rotational control method with the CAV scheme in the embodiment.
Figure 7C:
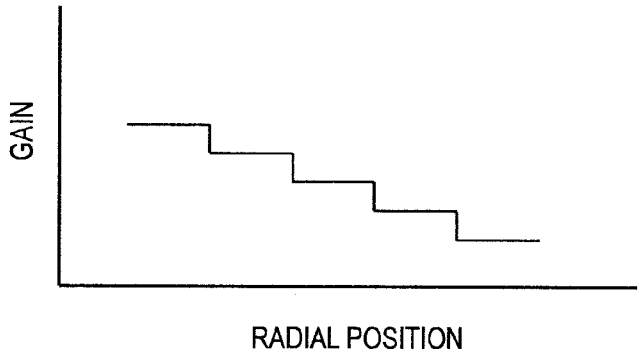
FIG. 7C is a drawing illustrating another method of controlling the monitor diode gain in a recording operation using a rotational control method with the CAV scheme in the embodiment.
Figure 7D:
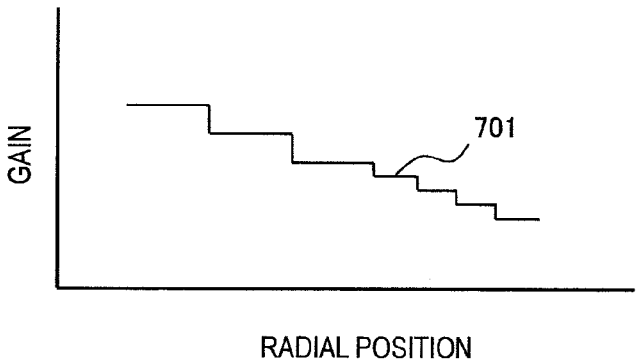
FIG. 7D is a drawing illustrating yet another method of controlling the monitor diode gain in a recording operation using a rotational control method with the CAV scheme in the embodiment.

Hereinafter, methods of gain control of the monitor diode 121 will be described in the individual rotational control methods (recording frequency control methods) for recording operations. FIG. 7A to FIG. 7D are drawings illustrating the methods of monitor diode gain control in recording operations using the rotational control method of the CAV scheme. FIG. 7A is a graph showing the relationship between the disc radial position and the recording frequency; FIG. 7B to FIG. 7D schematically illustrates the relationships between the monitor diode gain and the disc radial position under different control methods.

The control method illustrated by FIG. 7B decreases the monitor diode gain linearly from the innermost diameter to the outermost diameter. The gain decreases linearly with the distance from the center. Typically, the system controller 114 uses a preset gain calculation formula and the address indicating a recording position to calculate a value of the monitor diode gain in this control method.

Typically, the system controller 114 changes the gain at every track. The data is recorded spirally; a track is defined with reference to a specific position in a circumferential direction. The gain can be expressed by a linear expression with respect to the disc radial position. The system controller 114 may use a gain setting table.

The control method illustrated by FIG. 7C decreases the monitor diode gain stepwise from the innermost diameter to the outermost diameter. When the disc radial position is getting away from the innermost diameter and reaches a threshold, the monitor diode gain decreases discontinuously. The monitor diode gain changes at each of a plurality of thresholds. Inside each area defined between two thresholds, the monitor diode gain is constant. Each area is composed of a plurality of tracks.

The system controller 114 may use a gain setting table exemplified by FIG. 8 to determine the gain value. The threshold N (N is a natural number from 1 to 4) is a value representing a disc radial position, typically, an address. The gain G_N (N is a natural number from 0 to 4) indicates a value of the monitor diode gain. (G_N+1)−(G_N) is a negative value.

The system controller 114 uses the gain G_0 in the area which is inner than the threshold 1 and uses the gain G_1 in the area between the threshold 1 and the threshold 2. In similar, it uses the gain G_2 in the area between the threshold 2 and the threshold 3, and the gain G_3 in the area between the threshold 3 and the threshold 4. It uses the gain G_4 in the area from the threshold 4 to the recording end to be used in recording data. The system controller 114 uses the gain G_N−1 until the radial position in a recording operation reaches the threshold N (N is a natural number from 1 to 4), and when it exceeds the threshold N, the system controller 114 changes the gain to G_N.

The differences in the gain value between two adjacent areas ((G_N)−(G_N−1)) may be the same in a recording surface or different depending on the areas. The thresholds that define each area in which the gain is constant, the value of the monitor diode gain in each area, and the difference in gain value between adjacent areas are determined appropriately by the design of the optical disc drive 100.

In general, after the gain of the monitor diode 121 has been reset at a new value, it takes a while until the operation of the monitor diode 121 is stabilized. Accordingly, too frequent changes of the gain of the monitor diode 121 cause delay in recording operations. Changing the monitor diode gain for every area having a specific width (changing the monitor diode gain stepwise) suppresses adverse effects to the recording operation time and achieves more accurate APC.

In the control method illustrated by FIG. 7C, the width (the size in the radial direction) of each area defined by thresholds is the same. The difference in gain between any two adjacent constant-gain areas is also the same. The control method illustrated by FIG. 7D varies the width of constant-gain area among the areas. Specifically, it increases the frequency of changing the gain on the outer diameter side. This configuration effectively suppresses the noise in the monitor diode output.

In an outer area, the recording frequency is higher and the gain of the monitor diode 121 is lower. Accordingly, compared with an inner area, the effect of noise is higher in an outer area. For this reason, in an outer area, it is preferable to set the gain of the monitor diode 121 at a value as high as possible while keeping the monitor diode output not to be saturated or to be at a low saturation level.

Increasing the number of changes (the frequency of changing) of the gain for a unit amount of change in radial position (unit size in the radial direction) enables the gain to be set at a value close to the one optimum for the disc radial position. In typical, as the system controller 114 increases the frequency of changing, it decreases the amount of gain to be changed at one time.

FIG. 7D illustrates an example of control that narrows the width of constant-gain area (increases the frequency of changing the gain) in outer areas. The control method illustrated in FIG. 7D has two different frequencies of changing; the frequency of changing is higher in the outer areas than in inner areas. From the viewpoint of the width (the size in the radial direction) of constant-gain area, this control method uses two different widths. The width of each area is equal to or less than the width of the areas inner than the area.

In the example of FIG. 7D, the system controller 114 changes the width of area at a constant-gain area 701. The width of the constant-gain areas inner than the area 701 is wider than the width of the area 701 and the areas outer than the area 701. In the constant-gain area 701 and the areas outer than that, the gain difference between constant-gain areas is smaller than the gain difference between inner areas.

The system controller 114 may use three or more widths of constant-gain area (frequencies of changing). It may decrease the width of constant-gain area for every area from the innermost diameter to the outermost diameter. In other words, all the constant-gain areas may have different widths. Alternatively, some constant-gain areas may have the same width. The width decreases from the innermost area toward the outermost area. Decreasing the width of constant-gain area, which means increasing the frequency of changing, toward the outermost area appropriately suppresses the effect of noise to the monitor diode output in the outer areas to achieve more accurate APC.

Although the system controller 114 may change the monitor diode gain continuously (typically at every track) in an area outer than a specific radial position, it is preferable to change it stepwise as described above. Depending on the design of the optical disc drive 100, the width of area may be changed depending on the disc radial position in a method different from the above-described one.

Figure 9A:
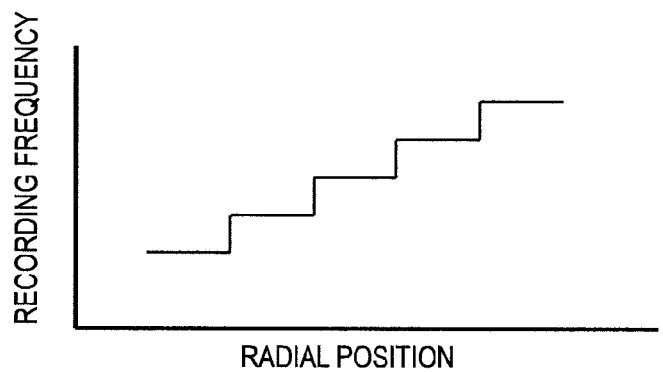
FIG. 9A is a graph depicting the relationship between the disc radial position and the recording frequency in a recording operation using the ZCLV scheme in the embodiment.
Figure 9B:
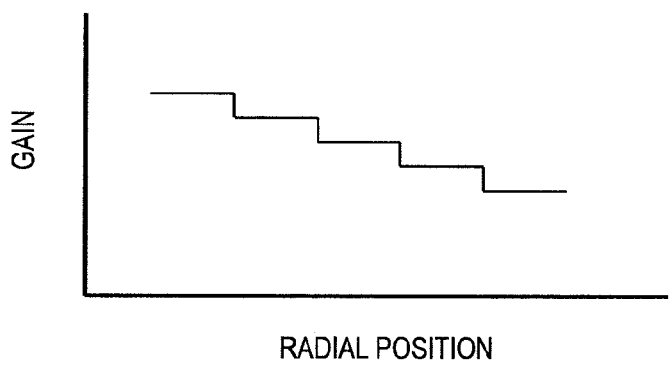
FIG. 9B is a drawing illustrating a method of controlling the monitor diode gain in a recording operation using a rotational control method with the ZCLV scheme in the embodiment.
Figure 9C:
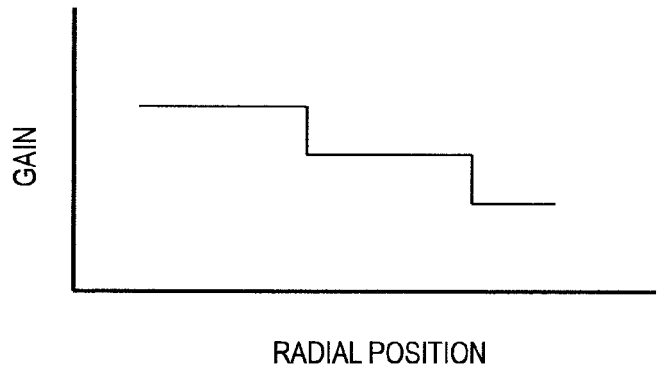
FIG. 9C is a drawing illustrating another method of controlling the monitor diode gain in a recording operation using a rotational control method with the ZCLV scheme in the embodiment.

Now, with reference to FIG. 9A to 9C, a method of controlling monitor diode gain in a recording operation using the rotational control method of ZCLV scheme will be described. FIG. 9A is a graph showing the relationship between the disc radial position and the recording frequency in the ZCLV scheme; FIG. 9B and FIG. 9C schematically illustrate relationships between the monitor diode gain and the disc radial position in different control methods.

FIG. 9A shows the recording frequency in five zones. In each zone, the linear velocity is constant and the recording frequency is also constant. As the radial position moves toward the outermost diameter, the recording frequency increases stepwise. Namely, between two adjacent zones, the recording frequency is higher in the outer zone than in the inner zone. A zone is composed of a plurality of tracks.

As shown in FIG. 9B, in a preferable configuration, the system controller 114 changes the monitor diode gain at each boundary of zone. In each zone, the monitor diode gain is constant. The monitor diode gain decreases stepwise toward the outermost diameter. Such monitor diode gain control in accordance with the zones leads overall control of recording operations to be simpler.

As shown in FIG. 9C, the system controller 114 may use the same monitor diode gain value across a plurality of zones. At a part of all the boundaries of zone, the system controller 114 changes the monitor diode gain. The change in monitor diode gain depending on the disc radial position (recording frequency) in FIG. 9C shows stepwise decreases toward the outermost diameter, like in the example of FIG. 9B.

To recording operations using the ZCLV scheme, the monitor diode gain control described with the CAV scheme can be applied. For example, the system controller 114 may narrow the width of constant-gain area in outer areas. In the case of application of the control described with the CAV scheme, it is preferable that the gain be changed at a zone boundary. Depending on the design, the system controller 114 may change the monitor diode gain within a zone.

To recording operations using the ZCAV scheme, the above-described monitor diode gain control for recording operations using the CAV scheme can be applied. As illustrated in FIG. 5, a recording operation using the ZCAV scheme records data by the CAV scheme in each zone. Accordingly, the above-described monitor diode gain control described with the CAV scheme can be used in each zone.

As set forth above, preferred embodiment of this invention has been described, but this invention is not limited to the above-described embodiment. Those skilled in the art can easily modify, add, or convert each component in the above-described embodiment within the scope of this invention.

What is claimed is:

1. An optical disc drive comprising:
   a motor for rotating an optical disc;
   a laser light source for emitting laser light to the optical disc being rotated;
   a monitor photodetector for receiving the laser light from the laser light source to control the laser light;
   a laser power controller for controlling output power of the laser light source depending on output of the monitor photodetector;
   a controller for controlling gain of the monitor photodetector in a recording to a recording surface of the optical disc depending on recording frequency changing with disc radial position.

2. The optical disc drive according to claim 1, wherein the controller controls the gain so that the gain decreases stepwise from the innermost diameter to the outermost diameter of the recording surface.

3. The optical disc drive according to claim 2, wherein the controller narrows widths of areas in each of which the gain is constant on an outer diameter side.

4. The optical disc drive according to claim 1, wherein:
   the recording surface is separated into a plurality of zones in a recording to the recording surface;
   the recording frequency is constant in each of the plurality of zones; and
   the controller changes the gain at one or more zone boundaries of the plurality of zones.

5. The optical disc drive according to claim 4, wherein the controller changes the gain at every zone boundary of the plurality of zones.

6. A method of controlling power of laser light in a recording to an optical disc by an optical disc drive, comprising:
   setting a gain of a monitor photodetector depending on recording frequency changing with disc radial position on a recording surface of the optical disc;
   receiving laser light from the optical disc at the monitor photodetector, converting the laser light into an electric signal, and amplifying the electric signal in accordance with the set gain; and
   controlling power of the laser light depending on the electric signal from the monitor photodetector.

7. The method according to claim 6, wherein the gain the gain decreases stepwise from the innermost diameter to the outermost diameter of the recording surface.

8. The method according to claim 7, wherein widths of areas in each of which the gain is constant are narrowed on an outer diameter side.

9. The method according to claim 6, wherein:
   the recording surface is separated into a plurality of zones in a recording to the recording surface;
   the recording frequency is constant in each of the plurality of zones; and
   the controller changes the gain at one or more zone boundaries of the plurality of zones.

10. The method according to claim 9, wherein the gain is changed at every zone boundary of the plurality of zones.

* * * * *